UNITED STATES PATENT OFFICE.

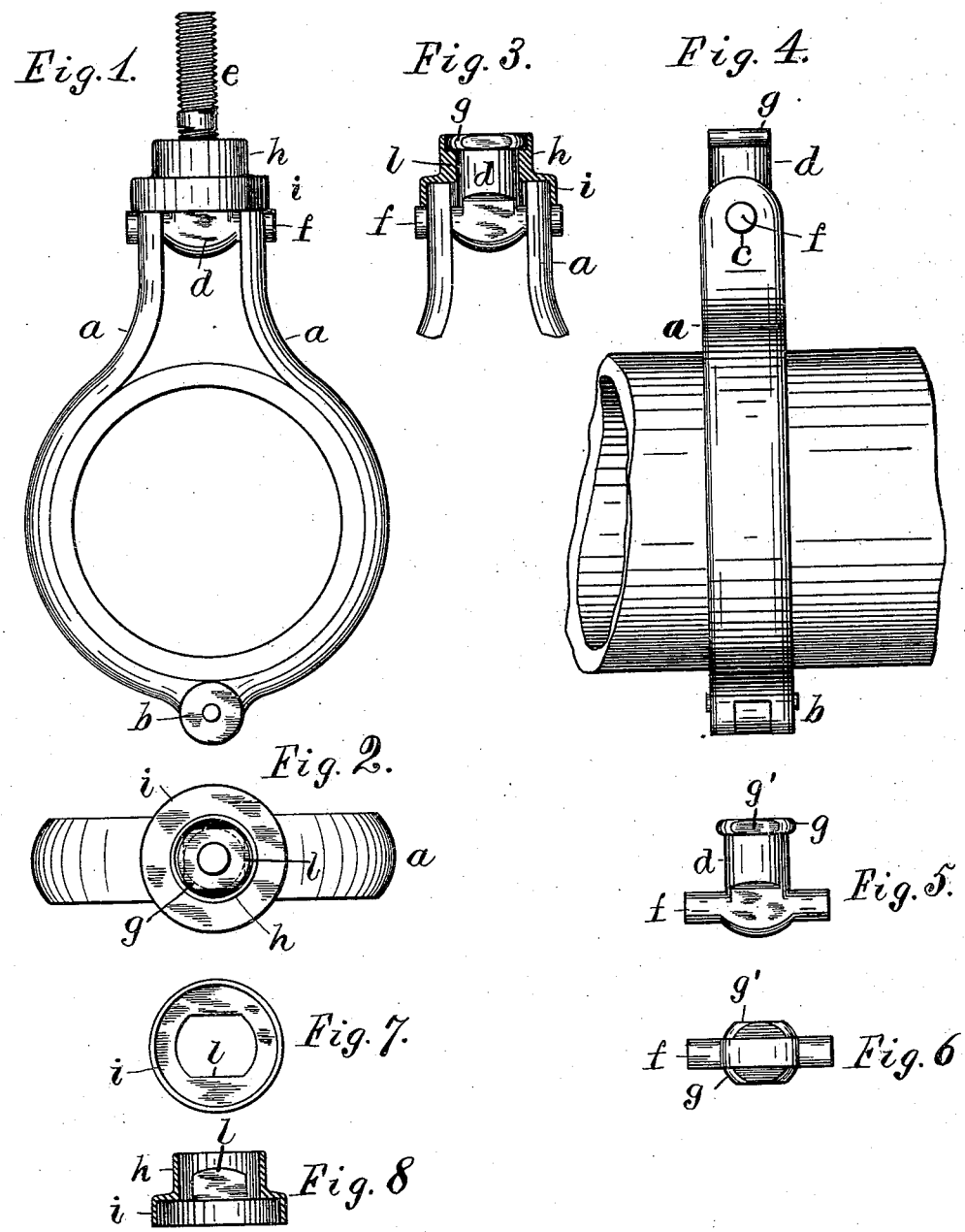

GEORGE C. BLACKMORE, OF NEWARK, NEW JERSEY, ASSIGNOR TO THE BLACKMORE HEATING COMPANY, OF SAME PLACE.

PIPE-HANGER.

SPECIFICATION forming part of Letters Patent No. 475,006, dated May 17, 1892.

Application filed June 27, 1891. Serial No. 397,688. (No model.)

*To all whom it may concern:*

Be it known that I, GEORGE C. BLACKMORE, a citizen of the United States, residing at Newark, Essex county, New Jersey, have invented certain new and useful Improvements in Pipe-Hangers, fully described and represented in the following specification and the accompanying drawings, forming a part of the same.

This invention relates to such pipe-hangers as are formed with a jointed stirrup detachable from a head fixed to the ceiling; and the improvement consists in the means of connection between the links of the stirrup and the head, whereby they may be readily detached without raising the pipe, and when attached to the head may be securely locked thereon independent of the action of gravity, which has been commonly relied upon in such constructions.

The construction will be understood by reference to the annexed drawings, in which—

Figure 1 is an end view of a pipe supported in the hanger. Fig. 2 is a plan of the head with the locking-collar secured thereon. Fig. 3 is a view of the head with the top of the links similar to Fig. 1, with the locking-cap in section. Fig. 4 is an edge view of the hanger with the cap removed. Fig. 5 is a side view of the head of the hanger, and Fig. 6 a bottom view of the same. Fig. 7 is a plan of the cap, and Fig. 8 a transverse section of the same.

*a* are the links of the hanger, with bottom joint at *b* and circular holes *c* formed through their upper ends to fit pins upon opposite sides of the head.

*d* is the head, which is commonly provided with screw *e* to attach it to the ceiling. The head is formed with a cylindrical body and flange or collar *g* at the top, and the pins *f* are made straight and projected from the opposite sides of the head, and are shown of round form adapted to fit loosely in the holes *c* in the links. With such construction it is obvious that the links, when hung upon the pins, would be liable to slip off, but that such a construction is an advantage in removing the links from the pins when the weight of the pipe is resting thereon.

To prevent the accidental slipping of the links from the pins, a locking-cap is provided consisting in a sleeve *h*, adapted to slip over the collar *g* and provided at the lower end with an annular flange *i* of suitable dimensions to fit outside the ends of the links. The weight of the collar holds the flange upon the links in such manner as to prevent them from moving laterally, and thus slipping off of the pins. The collar is not liable to lift voluntarily; but to secure it from vertical movement upon the head the collar *g* is flattened at opposite sides, as at *g'*, and the sleeve *h* is provided with segmental lugs *l*, adapted to slip past the flats when the sleeve is dropped upon the head. The lugs are adapted, when the sleeve is rotated, to pass beneath the remaining sections of the collar, as shown in Fig. 2, thus securing the cap from upward movement, as desired. The upper surface of the lug is shown slightly convex, so as to jam when turned in either direction beneath the collar *g*. The cap may be readily lifted from the ends of the links at any time, and the links, without lifting the same, may then be readily slipped from the ends of the pins *f* and the stirrup removed from the pipe. It is obvious that the collar *g* may be flattened upon one side only and the cap be provided with only one of the lugs *l*, as the engagement of such lug with the under side of the collar *g* would have the same effect. It is obviously more convenient to have the collar flattened upon both sides, whether one or more lugs *l* be provided within the cap, as it facilitates the slipping of the cap over the collar.

As the invention relates entirely to the holding of the upper ends of the links upon the pins *f*, it is obvious that the formation of the lower ends of the links is immaterial, as the invention would operate the same whether the links were joined together or hooked beneath the pipe separately.

Having thus set forth the nature of the invention, what is claimed herein is—

1. In a pipe-hanger, the combination, with a head having pins projected at opposite sides, of the jointed stirrup-links fitted to hang upon the pins, and the sleeve *h*, fitted to pass over the collar *g* upon the head, and having the downwardly-projecting flange *i*, adapted to fit over the ends of the links, the collar and head being provided with interlocking parts to retain the collar in its operative position, as and for the purpose set forth.

2. In a pipe-hanger, the combination, with a head having pins projected at opposite sides, and a collar flattened, as described, of the jointed stirrup-links fitted to hang upon the pins, and the sleeve $h$, fitted to pass over the collar $g$, and provided with one or more internal seats $l$ and having the downwardly-projecting flange $i$ to fit over the ends of the links, as and for the purpose set forth.

GEORGE C. BLACKMORE.

In presence of—
L. LEE,
H. J. MILLER.